United States Patent
Shin

(10) Patent No.: US 12,549,707 B2
(45) Date of Patent: *Feb. 10, 2026

(54) DECODING DEVICE AND OPERATING METHOD THEREOF

(71) Applicant: SAMSUNG ELECTRONICS CO., LTD., Suwon-si (KR)

(72) Inventor: Pureuna Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,854

(22) Filed: May 31, 2024

(65) Prior Publication Data

US 2024/0323345 A1 Sep. 26, 2024

Related U.S. Application Data

(63) Continuation of application No. 17/895,345, filed on Aug. 25, 2022, now Pat. No. 12,028,510.

(30) Foreign Application Priority Data

Sep. 3, 2021 (KR) ........................ 10-2021-0117949

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/423* (2014.11);
(Continued)

(58) Field of Classification Search
None
See application file for complete search history.

(56) References Cited

U.S. PATENT DOCUMENTS 9,148,667 B2    9/2015  Chien et al.
12,028,510 B2 *  7/2024  Shin ...................... H04N 19/46
(Continued)

FOREIGN PATENT DOCUMENTS

JP    2003-009157    1/2003
JP    2005-277996   10/2005
(Continued)

*Primary Examiner* — Kaitlin A Retallick
(74) *Attorney, Agent, or Firm* — Fish & Richardson P.C.

(57) ABSTRACT

A decoding device includes: an entropy decoder configured to decode a bitstream and generate prediction information and sequence information of each of the plurality of coding units; an inter predictor configured to perform inter prediction on each of inter coding units among the plurality of coding units based on the prediction information; an intra predictor configured to perform intra prediction on each of intra coding units among the plurality of coding units, based on the prediction information, and generate intra prediction data of each of the intra coding units; a memory for storing the inter prediction data of each of the inter coding units; and a reconstructor configured to reconstruct each of the inter coding units, based on the inter prediction data stored in the memory, and reconstruct each of the intra coding units based on the intra prediction data.

17 Claims, 9 Drawing Sheets

(51) Int. Cl.
    *H04N 19/423*     (2014.01)
    *H04N 19/46*     (2014.01)
    *H04N 19/503*     (2014.01)
    *H04N 19/593*     (2014.01)
    *H04N 19/91*     (2014.01)

(52) U.S. Cl.
    CPC ........... H04N 19/46 (2014.11); H04N 19/503 (2014.11); H04N 19/593 (2014.11); H04N 19/91 (2014.11)

(56) References Cited

U.S. PATENT DOCUMENTS

| | | |
|---|---|---|
| 2006/0133491 A1 | 6/2006 | Lee et al. |
| 2007/0147516 A1 | 6/2007 | Kosuge |
| 2008/0019445 A1 | 1/2008 | Aono et al. |
| 2010/0080288 A1* | 4/2010 | Hamamoto ............ H04N 19/17 375/240.03 |
| 2013/0064292 A1* | 3/2013 | Song .................... H04N 19/109 375/240.03 |
| 2016/0080773 A1* | 3/2016 | Nakamura ........... H04N 19/186 375/240.12 |
| 2016/0373767 A1* | 12/2016 | Yang .................... H04N 19/146 |
| 2020/0029071 A1* | 1/2020 | Kang .................... H04N 19/176 |
| 2021/0090301 A1* | 3/2021 | Mammou ............. H04N 19/20 |
| 2021/0105477 A1* | 4/2021 | Koo ..................... H04N 19/119 |

FOREIGN PATENT DOCUMENTS

| | | |
|---|---|---|
| KR | 10-1379188 | 4/2014 |
| KR | 10-1847077 | 5/2018 |

* cited by examiner

DECODING DEVICE AND OPERATING METHOD THEREOF

CROSS-REFERENCE TO RELATED APPLICATION

This application is based on and claims priority under 35 U.S.C. § 119 to Korean Patent Application No. 10-2021-0117949, filed on Sep. 3, 2021, in the Korean Intellectual Property Office, the disclosure of which is incorporated by reference herein in its entirety.

BACKGROUND

The disclosure relates to an electronic device and, more particularly, to a decoding device and an operating method thereof.

In order to effectively transmit and receive a digital video, a video compression scheme for reducing the size of the digital video is used. The digital video is divided into coding units of various sizes and then compressed. A decoding device is required for decoding a compressed video stream.

Intra prediction uses reconstructed pixel data of a reference coding unit, and thus, intra prediction is performed in the decoding sequence of coding units. In order to perform intra prediction in a decoding sequence, an intra predictor controls a point of time of starting inter prediction on a coding unit. When the intra predictor controls the point of time of starting inter prediction, the decoding speed may be reduced as the digital video is divided into coding units of various sizes.

SUMMARY

The disclosure describes a decoding device capable of storing, in a memory, inter prediction data of an inter coding unit and decoding video by using the stored inter prediction data, thereby having higher decoding speed and an operating method of the decoding device.

According to an aspect of the disclosure a decoding device including an entropy decoder is configured to: (1) receive a bitstream including encoded video data including large coding units each divided into a plurality of coding units, (2) decode the bitstream, and (3) generate: (a) prediction information indicating a prediction mode of each of the plurality of coding units and (b) sequence information indicating a decoding sequence index of each of the plurality of coding units. An inter predictor is configured to perform inter prediction on each of inter coding units, which are coding units to undergo inter prediction among the plurality of coding units, based on the prediction information. An intra predictor is configured to perform intra prediction on each of intra coding units, which are coding units to undergo intra prediction among the plurality of coding units, based on the prediction information and generate intra prediction data, which is a result of performing intra prediction on each of the intra coding units. A memory stores the inter prediction data, which is the result of performing inter prediction on each of the inter coding units. A reconstructor is configured to reconstruct each of the inter coding units based on the inter prediction data stored in the memory and reconstruct each of the intra coding units based on the intra prediction data.

According to another aspect of the disclosure, a decoding device includes an entropy decoder configured to: (1) receive a bitstream including encoded video data including large coding units each divided into a plurality of coding units, (2) decode the bitstream, and (3) generate: (a) prediction information indicating a prediction mode of each of the plurality of coding units and (b) sequence information indicating a decoding sequence index of each of the plurality of coding units. A plurality of inter predictors is configured to perform inter prediction on each of inter coding units, which are coding units to undergo inter prediction among the plurality of coding units, based on the prediction information. An inter controller is configured to control the plurality of inter predictors to perform inter prediction on different coding units. An intra predictor is configured to perform intra prediction on each of intra coding units, which are coding units to undergo intra prediction among the plurality of coding units, based on the prediction information and generate intra prediction data, which is a result of performing intra prediction on each of the intra coding units. A memory stores the inter prediction data, which is the result of performing inter prediction on each of the inter coding units. A reconstructor is configured to reconstruct each of the inter coding units based on the inter prediction data stored in the memory and reconstruct each of the intra coding units based on the intra prediction data.

According to another aspect of the disclosure, a decoding method includes: receiving a bitstream including encoded video data including large coding units each divided into a plurality of coding units; decoding the bitstream and generating prediction information indicating a prediction mode of each of the plurality of coding units and sequence information indicating a decoding sequence index of each of the plurality of coding units; and determining whether to perform inter prediction on a current coding unit, which is to be currently decoded, based on the prediction information and the sequence information. When inter prediction is performed on the current coding unit, the method generates inter prediction data, which is a result of performing inter prediction on the current coding unit, and stores the inter prediction data in a memory. When intra prediction is performed on the current coding unit, the method generates intra prediction data, which is a result of performing intra prediction on the current coding unit. The current coding unit is reconstructed based on one of the inter prediction data stored in the memory and the intra prediction data.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
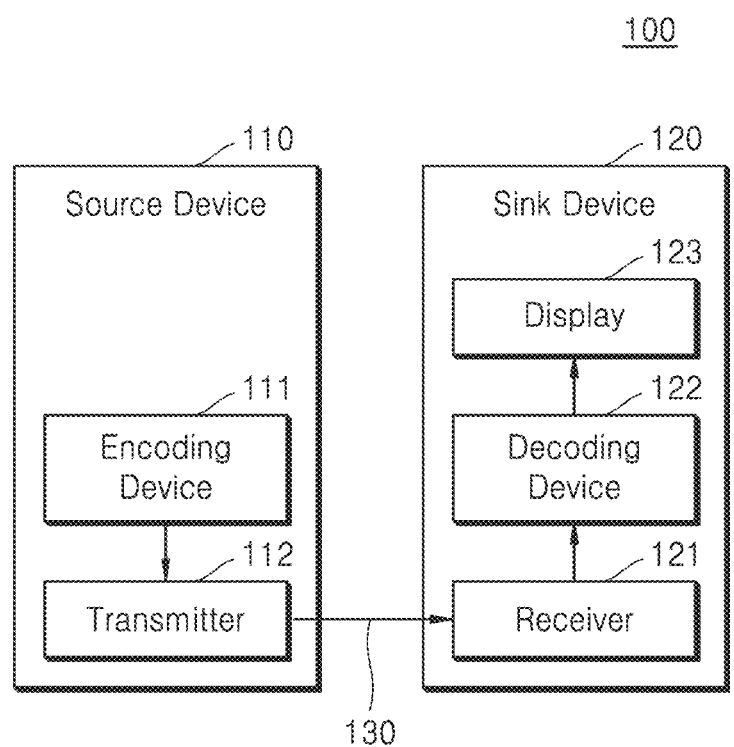
FIG. 1 is a diagram illustrating a video system according to an embodiment of the disclosure.

Hereinafter, embodiments of the disclosure will be described in detail with reference to the accompanying drawings. The embodiments of the disclosure are provided to fully convey the scope of the disclosure to one of ordinary skill in the art. As the disclosure allows for various changes and numerous embodiments, particular embodiments will be illustrated in the drawings and described in detail. However, this is not intended to limit the disclosure to particular modes of practice, and it is to be appreciated that all changes, equivalents, and substitutes that do not depart from the spirit and technical scope of the disclosure are encompassed in the disclosure.

FIG. 1 is a diagram illustrating a video system 100 according to an embodiment of the disclosure.

Referring to FIG. 1, the video system 100 may include a source device 110 and a sink device 120. According to embodiments, the video system 100 may further include other general-purpose components in addition to the components illustrated in FIG. 1.

The source device 110 may include an encoding device 111 and a transmitter 112. The source device 110 may be an electronic device that generates video data by itself or receives video data. The source device 110 may be implemented in various forms, for example, an optical media reproduction device such as a Digital Versatile Disc (DVD) or Blu-ray player, an Ultra-High-Definition (UHD) player, a set-top box, a television (TV), a computer, a mobile device, a home theater, a game console, a content server, etc.

The encoding device 111 may receive video data. For example, the encoding device 111 may receive video data from a video capture device such as a video camera and a video archive storing previously captured videos.

The video data may be a series of video frames. The video data may include large coding units, and each of the large coding units may include a plurality of coding units. The large coding units may have fixed or variable sizes and may vary in size according to a particular encoding standard. For example, the size of the large coding unit may be 32×32 pixels, 64×64 pixels, or 128×128 pixels, but is not necessarily limited thereto. The plurality of coding units included in the large coding unit may have different sizes or the same size. The coding unit may include a luma coding unit and a chroma coding unit.

The encoding device 111 may encode video data. The encoded video data may be output in the form of a bitstream. Frames of the encoded video data may be output in the form of a bitstream. According to intra- or inter-based prediction of video coding units, the encoding device 111 may perform quantization operations and entropy coding operations to encode video data. The encoding device 111 may operate according to a video compression scheme such as Advanced Video Coding (AVC), VP8, VP9, High Efficiency Video Coding (HEVC), AOMedia Video 1 (AV1), AVS3, or the like.

The transmitter 112 may transmit, to a receiver 121 of the sink device 120, the bitstream output from the encoding device 111 in the format of a file or streaming data. In detail, the transmitter 112 may transmit the bitstream output from the encoding device 111 to the receiver 121 through a communication channel 130.

The communication channel 130 may transmit to the receiver 121 a video stream encoded through the source device 110.

The communication channel 130 may include any wireless or wired communication medium, such as a radio frequency (RF) spectrum, one or more physical transmission lines, or any combination of wireless and wired media. The communication channel 130 may form part of a packet-based network, such as a local area network, a wide-area network, or a global network such as the Internet. The communication channel 130 generally represents any suitable communication medium or collection of different communication media for transmitting encoded video data from the source device 110 to the receiver 121.

The sink device 120 may include the receiver 121, a decoding device 122, and a display 123. The sink device 120 may be an electronic device that processes and reproduces video data (e.g., encoded video data) transmitted from the source device 110. Here, the term "reproduction" may refer to displaying an image according to processed video data, outputting audio according to processed audio data, or displaying and outputting an image and audio according to processed video data and audio data. The sink device 120 may be implemented in various forms such as a TV, a monitor, a portable multimedia player, a mobile phone, a tablet, an electronic picture frame, an electronic blackboard, an electronic advertising board, etc. Although FIG. 1 illustrates that the encoding device 111 is included in the source device 110 and the decoding device 122 is included in the sink device 120, the disclosure is not limited thereto, and the encoding device 111 and the decoding device 122 may be included in the source device 110 and/or the sink device 120. In addition, the encoding device 111 and the decoding device 122 may form a codec.

The receiver 121 may receive a bitstream including encoded video data from the source device 110 through the communication channel 130.

The transmitter 112, the communication channel 130, and the receiver 121 may be configured for communication according to any wired or wireless communication system, including one or more of Ethernet, telephone, cable, power-line, and fiber optic systems, and/or a wireless system including one or more of a code-division multiple access (CDMA or CDMA2000) communication system, a frequency-division multiple access (FDMA) system, an orthogonal frequency-division multiplexing (OFDM) access system, a time-division multiple access (TDMA) system such as a Global System for Mobile Communications (GSM) system, General Packet Radio Service (GPRS), or enhanced data GSM environment (EDGE), a Terrestrial Trunked Radio (TETRA) mobile telephone system, a wideband code division multiple access (WCDMA) system, a high data rate 1×EV-DO (first-generation evolution data only) or 1×EV-DO Gold Multicast system, an IEEE 802.18 system, a MediaFLO™ system, a DMB system, a DVB-H system, or another scheme for data communication between two or more devices.

The decoding device 122 may receive a bitstream from the source device 110 and decode the bitstream. The decoding device 122 may receive a bitstream including encoded video data including large coding units each divided into a plurality of coding units. The decoding device 122 may decode the bitstream and generate prediction information indicating a prediction mode of each of the plurality of coding units and sequence information indicating a decoding sequence index of each of the plurality of coding units.

The decoding device 122 may perform, based on the prediction information, inter prediction on each of inter coding units, which are coding units to undergo inter prediction among the plurality of coding units included in the large coding unit.

The decoding device 122 may perform, based on the prediction information, intra prediction on each of intra coding units, which are coding units to undergo intra prediction among the plurality of coding units included in the large coding unit.

The decoding device 122 may include a memory for storing inter prediction data, which is a result of performing inter prediction on each of the inter coding units. The decoding device 122 may reconstruct each of the inter coding units based on the inter prediction data stored in the memory and generate reconstructed pixel data of each of the inter coding units. The decoding device 122 may filter the reconstructed pixel data to generate decoded pixel data. The decoding device 122 will be described in detail below with reference to FIG. 2.

The decoding device 122 may operate according to a video compression scheme such as AVC, VP8, VP9, HEVC, AV1, or AVS3. For example, the decoding device 122 may receive and decode video data which is encoded according to AVS3.

The sink device 120 may display the decoded pixel data to a user through the display 123. The display 123 may include any various display devices, such as a cathode-ray tube (CRT) display, a liquid-crystal display (LCD), a plasma display, a light-emitting diode (LED) display, an organic LED display, or other types of display units.

Each of the encoding device 111 and the decoding device 122 may be implemented as one or more microprocessors, digital signal processors (DSPs), application-specific integrated circuits (ASICs), field-programmable gate arrays (FPGAs), distributed logic, software, hardware, firmware, or any combination thereof. Each of the encoding device 111 and the decoding device 122 may be included in one or more encoders or decoders, either of which may be integrated as part of a combined encoder/decoder (CODEC) in a respective mobile device, subscriber device, broadcasting device, or the like.

Each of the source device 110 and the sink device 120 may include appropriate modulation, demodulation, frequency conversion, filtering, and amplifier components for transmission and reception of encoded video, which include RF wireless components and antennas sufficient to support wireless communication. For example, the components may be used as the transmitter 112 and the receiver 121.

Figure 2:
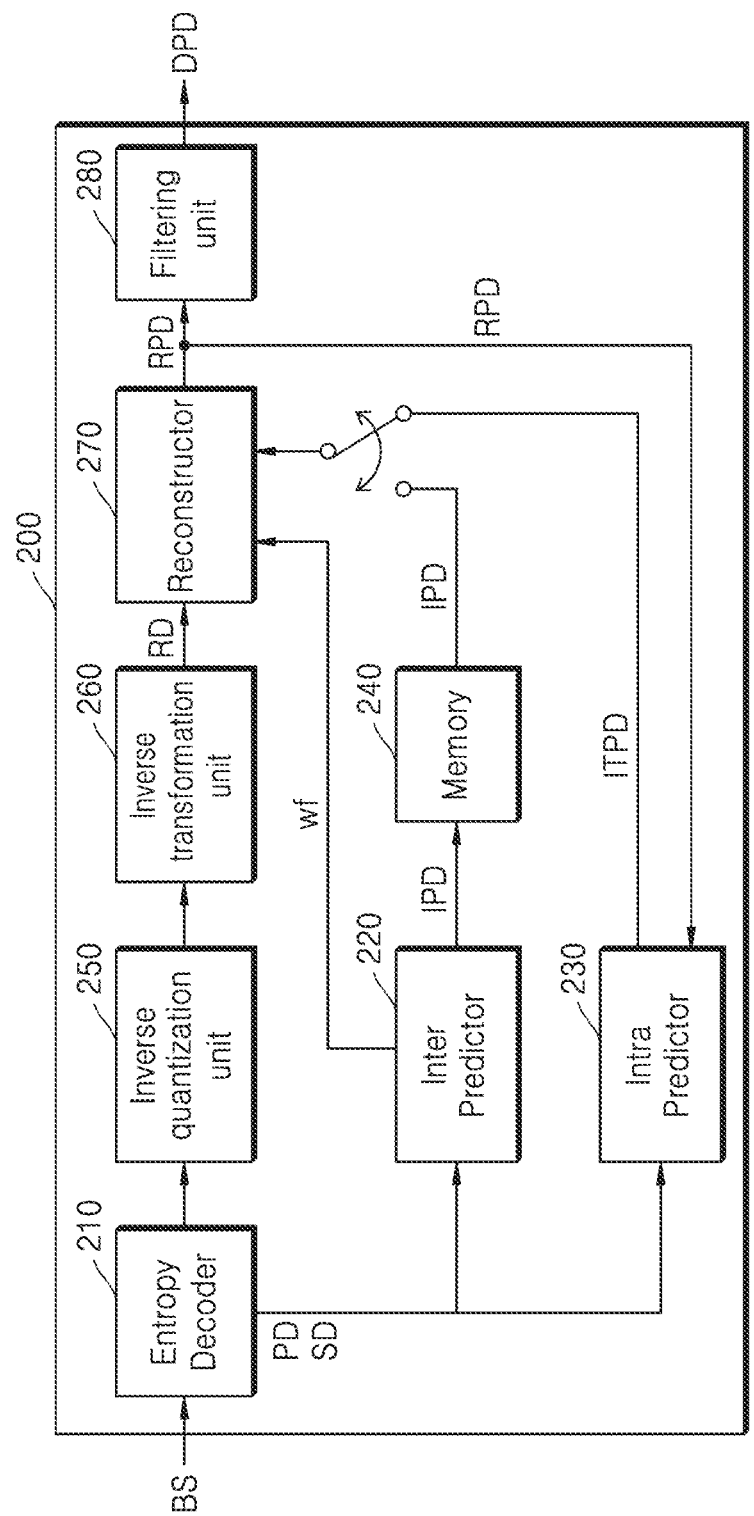
FIG. 2 is a block diagram illustrating a decoding device according to an embodiment of the disclosure.

FIG. 2 is a block diagram illustrating a decoding device 200, according to an embodiment of the disclosure.

Referring to FIG. 2, the decoding device 200 may include an entropy decoder 210, an inter predictor 220, an intra predictor 230, a memory 240, an inverse quantization unit 250, an inverse transformation unit 260, a reconstructor 270, and a filtering unit 280. The decoding device 200 of FIG. 2 corresponds to the decoding device 122 of FIG. 1, and thus, descriptions thereof that are already provided above will be omitted. According to embodiments, the decoding device 200 may further include other general-purpose components in addition to the components illustrated in FIG. 2.

The entropy decoder 210, the inter predictor 220, the intra predictor 230, the inverse quantization unit 250, the inverse transformation unit 260, the reconstructor 270, and the filtering unit 280 may be configured by one hardware component (e.g., a decoder or a processor) according to embodiments.

The entropy decoder 210 may receive a signal output from an encoding device (e.g., the encoding device 111 of FIG. 1) in the form of a bitstream BS. The bitstream BS may be decoded through the entropy decoder 210. The entropy decoder 210 may derive information required for decoding by parsing the bitstream BS. The entropy decoder 210 may decode information in the bitstream BS based on a coding methodology such as exponential-Golomb coding, context-adaptive variable-length coding (CAVLC), or context-adaptive binary arithmetic coding (CABAC).

The entropy decoder 210 may decode the bitstream BS and generate filtering information, quantized transform coefficients, and related parameter information. The entropy decoder 210 may provide the filtering information to the filtering unit 280 and provide the quantized transform coefficients and the related parameter information to the inverse quantization unit 250.

The entropy decoder 210 may decode the bitstream BS and may generate: (1) prediction information PD indicating a prediction mode of each of the plurality of coding units and (2) sequence information SD indicating a decoding sequence of each of the plurality of coding units. The information required for decoding may include the prediction information PD and the sequence information SD. The prediction information PD may refer to information indicating whether the prediction mode of each of the plurality of coding units is an inter prediction mode or an intra prediction mode. The prediction information PD may include information indicating a mode of intra prediction or a mode of inter prediction. The sequence information SD may refer to a sequence in which the plurality of coding units included in the large coding unit are reconstructed by the decoding device 200. The entropy decoder 210 may provide the prediction information PD and the sequence information SD to each of the inter predictor 220 and the intra predictor 230.

The inter predictor 220 may perform, based on the prediction information PD, inter prediction on each of the inter coding units, which are coding units to undergo inter prediction among the plurality of coding units. The inter coding unit may refer to a coding unit having the prediction information PD indicating the inter prediction mode. Although FIG. 2 illustrates that one inter predictor 220 is provided, the number of inter predictors 220 is not limited to one and a plurality of inter predictors 220 may be provided. The decoding device 200 including a plurality of inter predictors 220 will be described in detail below with reference to FIG. 7.

The inter predictor 220 may perform prediction on a current inter coding unit among the inter coding units and generate inter prediction data IPD, which is a result of performing inter prediction on the current inter coding unit. The inter predictor 220 may perform inter prediction on each of the inter coding units and generate the inter prediction data IPD of each of the inter coding units. The current inter coding unit may refer to an inter coding unit on which the inter predictor 220 is currently performing inter prediction. When performing inter prediction on the current inter coding unit, the inter prediction may be performed without using another coding unit of the large coding unit including the current inter coding unit.

By performing inter prediction, a predicted coding unit for a coding unit being currently decoded may be derived based on a reference coding unit specified by a motion vector on a reference frame. In order to reduce the amount of motion information transmitted in the inter prediction mode, the motion information may be predicted in units of coding units based on the correlation of the motion information between neighboring coding units and the coding unit being currently decoded. The motion information may include a motion vector and a reference frame index.

The intra predictor 230 may perform, based on the prediction information PD, intra prediction on each of the intra coding units, which are coding units to undergo intra prediction among the plurality of coding units. The intra coding unit may refer to a coding unit having the prediction information PD indicating an intra prediction mode.

The intra predictor 230 may perform prediction on a current intra coding unit among the intra coding units and generate intra prediction data ITPD, which is a result of performing intra prediction on the current intra coding unit. The intra predictor 230 may perform intra prediction on each of the intra coding units and generate the intra prediction data ITPD of each of the intra coding units. The current intra coding unit may refer to an intra coding unit on which the intra predictor 230 is currently performing intra prediction.

Intra prediction may be performed on the current intra coding unit with reference to other coding units of the large coding unit including the current intra coding unit or other coding units of a neighboring large coding unit. That is, intra prediction may be performed on the current intra coding unit with reference to reference coding units. Because prediction is performed on the current intra coding unit with reference to the coding units around the current intra coding unit, intra prediction may be performed on the intra coding unit according to a decoding sequence.

The reference coding units may be located around the current intra coding unit according to the prediction mode. For example, the reference coding unit may be at least one of coding units located above and to the left of the current intra coding unit. The coding units will be described in detail below with reference to FIG. 3. Hereinafter, FIGS. 2 and 3 will be referred together.

Figure 3:
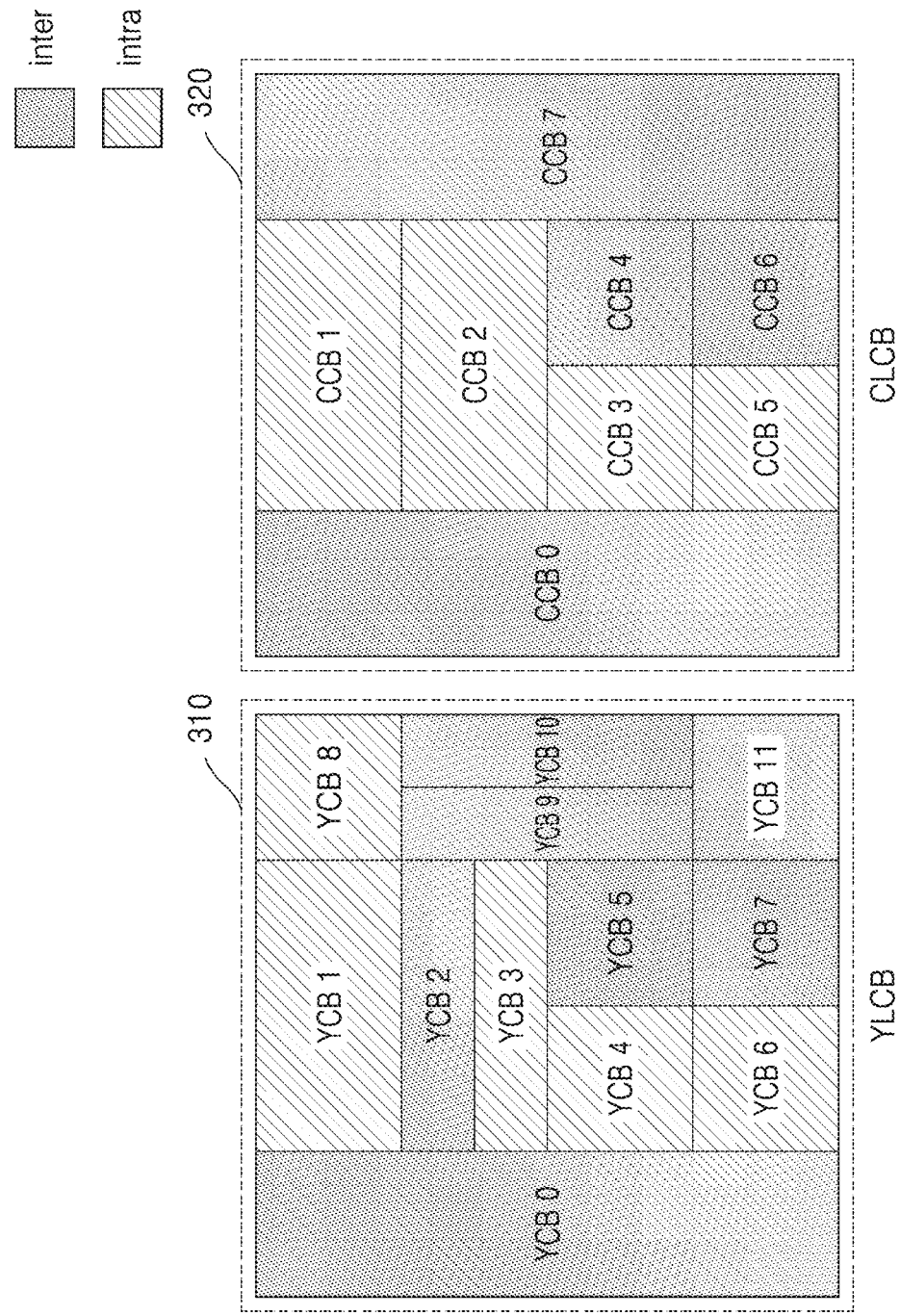
FIG. 3 is a diagram illustrating coding units according to an embodiment of the disclosure.

FIG. 3 is a diagram illustrating coding units according to an embodiment of the disclosure.

A large coding unit may include a luma large coding block 310 (hereinafter, also referred to as the YLCB 310), which is a luma component, and a chroma large coding block 320 (hereinafter, also referred to as the CLCB 320), which is a chroma component.

Referring to FIG. 3, the YLCB 310 may include a plurality of coding units. The YLCB 310 may include a plurality of luma coding blocks, and each of the plurality of luma coding blocks may correspond to one of an inter coding unit and an intra coding unit. For example, the YLCB 310 may include a first luma coding block YCB 0, a third luma coding block YCB 2, a sixth luma coding block YCB 5, an eighth luma coding block YCB 7, a tenth luma coding block YCB 9, an eleventh luma coding block YCB 10, and a twelfth luma coding block YCB 11, which are inter coding units. The YLCB 310 may also include a second luma coding block YCB 1, a fourth luma coding block YCB 3, a fifth luma coding block YCB 4, a seventh luma coding block YCB 6, and a ninth luma coding block YCB 8, which are intra coding units. The sizes of the plurality of coding units included in the YLCB 310 may be different from each other.

The CLCB 320 may include a plurality of coding units. The CLCB 320 may include a plurality of chroma coding blocks, and each of the plurality of chroma coding blocks may correspond to one of an inter coding unit and an intra coding unit. For example, the CLCB 320 may include a first chroma coding block CCB 0, a fifth chroma coding block CCB 4, a seventh chroma coding block CCB 6, and an eighth chroma coding block CCB 7, which are inter coding units. The CLCB 320 may also include a second chroma coding block CCB 1, a third chroma coding block CCB 2, a fourth chroma coding block CCB 3, and a sixth chroma coding block CCB 5, which are intra coding units. The sizes of the plurality of coding units included in the CLCB 320 may be different from each other.

The shape in which the YLCB 310 is divided into the plurality of coding units may be different from the shape in which the CLCB 320 is divided into the plurality of coding units. For example, the CLCB 320 may be divided into larger coding units than is the YLCB 310. However, the disclosure is not limited thereto, and the shape in which the YLCB 310 is divided into the plurality of coding units may be the same as the shape in which the CLCB 320 is divided into the plurality of coding units.

The YLCB 310 and the CLCB 320 may be simultaneously decoded by the decoding device 200. For example, the inter predictor 220 may perform inter prediction on the first chroma coding block CCB 0 while performing inter prediction on the first luma coding block YCB 0. The current inter coding unit may be the first luma coding block YCB 0 and the first chroma coding block CCB 0.

The sequence information SD may indicate a decoding sequence of a plurality of coding units. The decoding sequence of video data may be determined according to a method in which large coding units and coding units are split when the video data is encoded. It is assumed that, for the YLCB 310, decoding is sequentially performed on the first luma coding block YCB 0, the second luma coding block YCB 1, the third luma coding block YCB 2, the fourth luma coding block YCB 3, the fifth luma coding block YCB 4, the sixth luma coding block YCB 5, the seventh luma coding block YCB 6, the eighth luma coding block YCB 7, the ninth luma coding block YCB 8, the tenth luma coding block YCB 9, the eleventh luma coding block YCB 10, and the twelfth luma coding block YCB 11. It is also assumed that, for the CLCB 320, decoding is sequentially performed on the first chroma coding block CCB 0, the second chroma coding block CCB 1, the third chroma coding block CCB 2, the fourth chroma coding block CCB 3, the fifth chroma coding block CCB 4, the sixth chroma coding block CCB 5, the seventh chroma coding block CCB 6, and the eighth chroma coding block CCB 7.

Referring to FIGS. 2 and 3, the inter predictor 220 may perform inter prediction on the inter coding units according to the decoding sequence based on the sequence information SD. The inter predictor 220 may perform inter prediction in order of the earlier decoding order among the inter coding units, based on the sequence information SD. For example, the inter predictor 220 may perform inter prediction on the first luma coding block YCB 0 and then perform inter prediction on the third luma coding block YCB 2. As another example, the inter predictor 220 may perform inter prediction on the first chroma coding block CCB 0 and then perform inter prediction on the fifth chroma coding block CCB 4.

The inter predictor 220 may confirm, based on the prediction information PD, whether the current coding unit is an inter coding unit and perform inter prediction on the current coding unit, when the current coding unit is an inter coding unit. For example, the inter predictor 220 may confirm that the prediction information PD of the first luma coding block YCB 0 indicates the inter prediction mode and perform inter prediction on the first luma coding block YCB 0.

The intra predictor 230 may perform intra prediction on the intra coding units according to the decoding sequence based on the sequence information SD. The intra predictor 230 may perform intra prediction in order of the earlier decoding order among the intra coding units, based on the sequence information SD. For example, the intra predictor 230 may perform intra prediction on the second luma coding block YCB 1, and then perform intra prediction on the fourth luma coding block YCB 3. Intra prediction may be performed on the second luma coding block YCB 1, inter prediction may be performed on the third luma coding block YCB 2, and intra prediction may be performed on the fourth luma coding block YCB 3. As another example, the intra predictor 230 may perform intra prediction on the second chroma coding block CCB 1 and then perform intra prediction on the third chroma coding block CCB 2.

The inter predictor 220 may perform inter prediction on each inter coding unit independently from the intra predictor 230. The inter predictor 220 may receive the prediction information PD and the sequence information SD from the entropy decoder 210, but not receive any instruction to perform inter prediction on the inter coding units from the intra predictor 230, and then perform inter prediction on the inter coding units. Because inter prediction is performed on each inter coding unit independently from the intra predictor 230, the decoding speed may be improved.

The inter predictor 220 may store the inter prediction data IPD in the memory 240. The inter predictor 220 may perform inter prediction on each inter coding unit and store the inter prediction data IPD of each inter coding unit in the memory 240. For example, the inter predictor 220 may perform inter prediction on the first luma coding block YCB 0 and then store the inter prediction data IPD of the first luma coding block YCB 0 in the memory 240 and may perform inter prediction on the third luma coding block YCB 2 and then store the inter prediction data IPD of the third luma coding block YCB 2 in the memory 240.

The memory 240 may include a volatile memory such as dynamic random-access memory (DRAM), synchronous DRAM (SDRAM), or the like, and/or a non-volatile memory such as phase-change RAM (PRAM), magnetoresistive RAM (MRAM), resistive RAM (ReRAM), ferroelectric RAM (FRAM), or the like.

The inverse quantization unit 250 may inversely quantize the quantized transform coefficients to output transform coefficients. The inverse quantization unit 250 may rearrange the quantized transform coefficients in a two-dimensional block form. The inverse quantization unit 250 may perform inverse quantization on the quantized transform coefficients by using quantization step size information, which is a quantization parameter, and obtain the transform coefficients.

The inverse transformation unit 260 may inversely transform the transform coefficients output from the inverse quantization unit 250 and generate residual data RD.

The reconstructor 270 may reconstruct the current decoding block to generate reconstructed pixel data RPD. The reconstructor 270 may reconstruct an inter coding unit based on the inter prediction data IPD stored in the memory 240 and reconstruct an intra coding unit based on the intra prediction data ITPD. The reconstructor 270 may reconstruct each of coding units based on prediction data of each of the coding unit. For example, the reconstructor 270 may reconstruct the first luma coding block YCB 0 based on the inter prediction data IPD of the first luma coding block YCB 0 and reconstruct the second luma coding block YCB 1 based on the intra prediction data ITPD of the second luma coding block YCB 1.

The reconstructor 270 may add the inter prediction data IPD of each inter coding unit to the residual data RD of each the inter coding unit to generate the reconstructed pixel data RPD of each the inter coding unit. For example, the reconstructor 270 may generate the reconstructed pixel data RPD of the first luma coding block YCB 0 by adding the inter prediction data IPD of the first luma coding block YCB 0 to the residual data RD of the first luma coding block YCB 0.

The reconstructor 270 may add the intra prediction data ITPD of each intra coding unit to the residual data RD of each the intra coding unit to generate the reconstructed pixel data RPD of each intra coding unit. For example, the reconstructor 270 may generate the reconstructed pixel data RPD of the second luma coding block YCB 1 by adding the intra prediction data ITPD of the second luma coding block YCB 1 to the residual data RD of the second luma coding block YCB 1. The reconstructed pixel data PRD may be used for intra prediction of another coding unit in the current frame or may be used for inter prediction of a next frame after being filtered through the filtering unit 280.

The inter predictor 220 may transmit, to the reconstructor 270, a write flag wf indicating whether the inter prediction data IPD is stored in the memory 240. For example, when the inter prediction data IPD is stored in the memory 240, the inter predictor 220 may transmit the write flag wf indicating '1' to the reconstructor 270. When the inter prediction data IPD is not stored in the memory 240, the write flag wf indicating '0' may be transmitted to the reconstructor 270, but the disclosure is not limited thereto. The write flag wf may include information of the inter coding unit and information about whether the inter prediction data IPD of the inter coding unit is stored in the memory 240.

The inter predictor 220 may transmit the write flag wf to the reconstructor 270 whenever the inter prediction data IPD for each inter coding unit is generated. The inter predictor 220 may perform inter prediction on the inter coding unit and transmit the write flag wf to the reconstructor 270 whenever the generated inter prediction data IPD is stored in the memory 240. For example, the inter predictor 220 may perform inter prediction on the first luma coding block YCB 0 and transmit, to the reconstructor 270, the write flag wf corresponding to the first luma coding block YCB 0 and indicating '1' when the inter prediction data IPD of the first luma coding block YCB 0 is stored in the memory 240. The inter predictor 220 may perform inter prediction on the third luma coding block YCB 2 and transmit, to the reconstructor 270, the write flag wf corresponding to the third luma coding block YCB 2 and indicating '0' when the inter prediction data IPD of the third luma coding block YCB 2 is not stored in the memory 240.

Based on the write flag wf, the reconstructor 270 may read out the inter prediction data IPD corresponding to the write flag wf from the memory 240. When the current coding unit is an inter coding unit, the reconstructor 270 may identify the write flag wf corresponding to the current coding unit and read out the inter prediction data IPD corresponding to the write flag wf from the memory 240. The inter prediction data IPD corresponding to the write flag wf may refer to the inter prediction data IPD of an inter coding unit that is to be read out from the memory 240 by using the write flag wf.

In an embodiment, when the write flag wf indicates '1', the reconstructor 270 may read out the inter prediction data IPD corresponding to the write flag wf from the memory 240. When the write flag wf indicates '0', the reconstructor 270 may receive the inter prediction data IPD from the inter predictor 220.

The reconstructor 270 may reconstruct the inter coding unit corresponding to the write flag wf based on the read-out inter prediction data IPD. For example, when the write flag wf corresponding to the first luma coding block YCB 0 indicates '1', the reconstructor 270 may read out the inter prediction data IPD of the first luma coding block YCB 0 from the memory 240. The reconstructor 270 may generate the reconstructed pixel data RPD of the first luma coding block YCB 0 by adding the inter prediction data IPD of the first luma coding block YCB 0 to the residual data RD of the first luma coding block YCB 0. As another example, when the write flag wf corresponding to the first chroma coding block CCB 0 indicates '1', the reconstructor 270 may read out the inter prediction data IPD of the first chroma coding block CCB 0 from the memory 240. The reconstructor 270 may generate the reconstructed pixel data RPD of the first chroma coding block CCB 0 by adding the inter prediction data IPD of the first chroma coding block CCB 0 to the residual data RD of the first chroma coding block CCB 0.

The reconstructor 270 may reconstruct the inter coding unit based on the inter prediction data IPD previously stored in the memory 240, thereby reducing a period of time taken for waiting for the inter prediction data IPD of the inter coding unit to be generated and improving the decoding speed, in reconstruction of the inter coding unit.

The reconstructor 270 may reconstruct each of the inter coding units and each of the intra coding units based on the sequence information SD and generate the reconstructed pixel data RPD. The reconstructor 270 may reconstruct each of the inter coding units and each of the intra coding units according to the decoding sequence based on the sequence information SD. The reconstructor 270 may reconstruct the first luma coding block YCB 0 and generate the reconstructed pixel data RPD of the first luma coding block YCB 0. Thereafter, the reconstructor 270 may reconstruct the second luma coding block YCB 1 and generate the reconstructed pixel data RPD of the second luma coding block YCB 1. Thereafter, the reconstructor 270 may reconstruct the third luma coding block YCB 2 and generate the reconstructed pixel data RPD of the third luma coding block YCB 2.

The filtering unit 280 may improve image quality by applying filtering to the reconstructed pixel data RPD. The filtering unit 280 may generate decoded pixel data DPD by applying a filtering method to the reconstructed pixel data RPD. The filtering method may include, but is not limited to, deblocking filtering, sample adaptive offset, adaptive loop filter, bilateral filter, etc.

The decoded pixel data DPD may be output to the outside of the decoding device 200. The decoded pixel data DPD may be transmitted to a display (e.g., the display 123 of FIG. 1) and displayed to a user.

Figure 4:
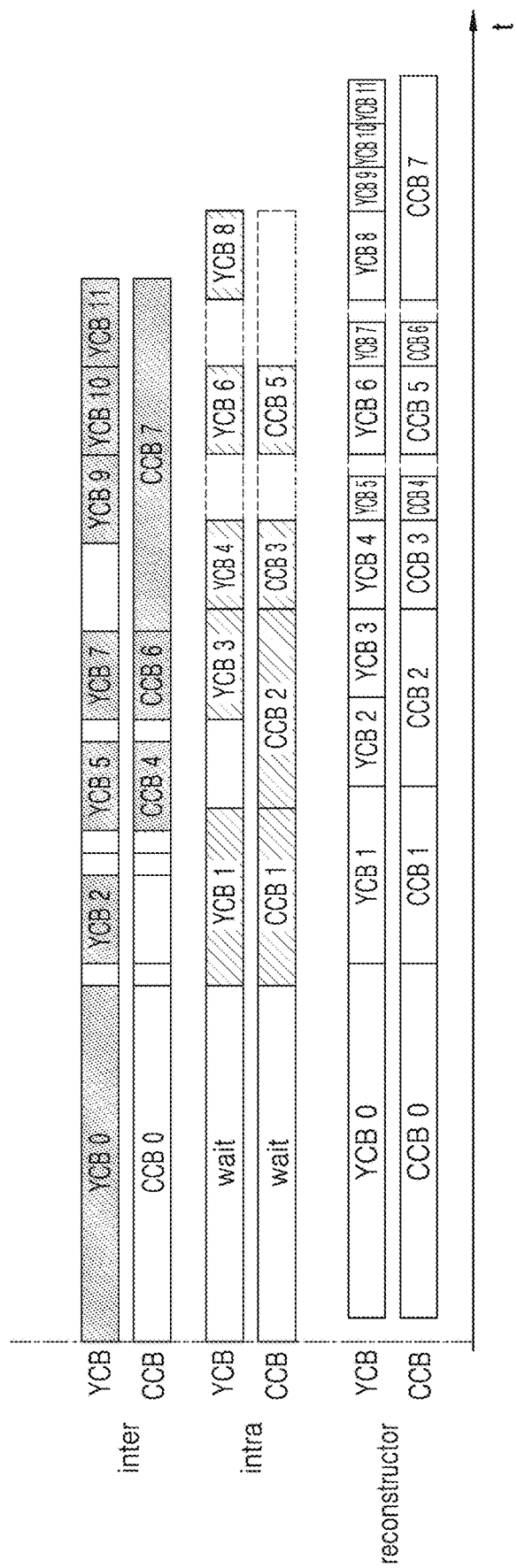
FIG. 4 is a diagram illustrating an operation sequence of coding units, according to an embodiment of the disclosure.

FIG. 4 is a diagram illustrating an operation sequence of coding units, according to an embodiment of the disclosure. Hereinafter, FIGS. 2 to 4 will be referenced together.

Referring to FIGS. 2 to 4, the inter predictor 220 may perform inter prediction on the luma large coding block 310 and the chroma large coding block 320. The intra predictor 230 may perform intra prediction on the luma large coding block 310 and the chroma large coding block 320. The reconstructor 270 may reconstruct the luma large coding block 310 and the chroma large coding block 320. The inter predictor 220, the intra predictor 230, and the reconstructor 270 may simultaneously perform operations on the luma large coding block 310 and the chroma large coding block 320.

The inter predictor 220 may sequentially perform inter prediction on the first luma coding block YCB 0, the third luma coding block YCB 2, the sixth luma coding block YCB 5, the eighth luma coding block YCB 7, the tenth luma coding block YCB 9, the eleventh luma coding block YCB 10, and the twelfth luma coding block YCB 11. The inter predictor 220 may sequentially perform inter prediction on the first chroma coding block CCB 0, the fifth chroma coding block CCB 4, the seventh chroma coding block CCB 6, and the eighth chroma coding block CCB 7.

The intra predictor 230 may sequentially perform intra prediction on the second luma coding block YCB 1, the fourth luma coding block YCB 3, the fifth luma coding block YCB 4, the seventh luma coding block YCB 6, and the ninth luma coding block YCB 8. The intra predictor 230 may sequentially perform intra prediction on the second chroma coding block CCB 1, the third chroma coding block CCB 2, the fourth chroma coding block CCB 3, and the sixth chroma coding block CCB 5.

The reconstructor 270 may sequentially reconstruct the first luma coding block YCB 0, the second luma coding block YCB 1, the third luma coding block YCB 2, the fourth luma coding block YCB 3, the fifth luma coding block YCB 4, the sixth luma coding block YCB 5, the seventh luma coding block YCB 6, the eighth luma coding block YCB 7, the ninth luma coding block YCB 8, the tenth luma coding block YCB 9, the eleventh luma coding block YCB 10, and the twelfth luma coding block YCB 11. The reconstructor 270 may sequentially reconstruct the first chroma coding block CCB 0, the second chroma coding block CCB 1, the third chroma coding block CCB 2, the fourth chroma coding block CCB 3, the fifth chroma coding block CCB 4, the sixth chroma coding block CCB 5, the seventh chroma coding block CCB 6, and the eighth chroma coding block CCB 7.

The intra predictor 230 may perform intra prediction on each intra coding unit based on the reconstructed pixel data RPD. The intra predictor 230 may perform intra prediction on each intra coding unit based on the reconstructed pixel data PRD of the reference coding unit corresponding to each the intra coding unit. The reference coding unit may refer to a coding unit adjacent to the current intra coding unit required to perform intra prediction on the current intra coding unit.

The reference coding unit may be at least one of coding units located above and to the left of each intra coding unit. For example, the reference coding unit of the second luma coding block YCB 1 may be the first luma coding block YCB 0 located at the left of the second luma coding block YCB 1. As another example, the reference coding units of the fourth luma coding block YCB 3 may be the first luma coding block YCB 0 located at the left of the fourth luma coding block YCB 3, and the third luma coding block YCB 2 located on the fourth luma coding block YCB 3.

The intra predictor 230 may perform intra prediction on the current intra coding unit based on the reconstructed pixel data PRD of the reference coding unit of each of the current intra coding unit. The intra predictor 230 may perform intra prediction on the second luma coding block YCB 1 based on the reconstructed pixel data RPD of the first luma coding block YCB 0, which is the reference coding unit of the second luma coding block YCB 1.

The inter predictor 220 may perform inter prediction on the first luma coding block YCB 0. The inter predictor 220 may store the inter prediction data IPD of the first luma coding block YCB 0 in the memory 240. The reconstructor 270 may read out, from the memory 240, the inter prediction data IPD of the first luma coding block YCB 0, based on the write flag wf of the first luma coding block YCB 0. The reconstructor 270 may generate the reconstructed pixel data RPD of the first luma coding block YCB 0 based on the read-out inter prediction data IPD. Because the first luma coding block YCB 0 corresponds to the reference coding unit of the second luma coding block YCB 1, the intra predictor 230 may perform intra prediction on the second luma coding block YCB 1 after inter prediction is performed on the first luma coding block YCB 0. The intra predictor 230 may perform intra prediction on the second luma coding block YCB 1 based on the reconstructed pixel data RPD of the first luma coding block YCB 0, which is the reference coding unit of the second luma coding block YCB 1.

Although FIGS. 3 and 4 illustrate that the first luma coding block YCB 0 is an inter coding unit and the second luma coding block YCB 1 is an intra coding unit, in the case where the first luma coding block YCB 0 is an intra coding unit and the second luma coding block YCB 1 is an inter coding unit, the intra predictor 230 may perform intra prediction on the first luma coding block YCB 0. Because the first luma coding block YCB 0 has no reference coding unit, the intra predictor 230 may directly perform intra prediction on the first luma coding unit YCB 0. The inter predictor 220 may perform inter prediction on the second luma coding unit YCB 1 while the intra predictor 230 performs intra prediction on the first luma coding unit YCB 0.

The inter predictor 220 may perform inter prediction on the first chroma coding block CCB 0. The inter predictor 220 may store the inter prediction data IPD of the first chroma coding block CCB 0 in the memory 240. The reconstructor 270 may read out, from the memory 240, the inter prediction data IPD of the first chroma coding block CCB 0 based on the write flag wf of the first chroma coding block CCB 0. The reconstructor 270 may generate the reconstructed pixel data RPD of the first chroma coding block CCB 0 based on the read-out inter prediction data IPD. Because the first chroma coding block CCB 0 corresponds to the reference coding unit of the second chroma coding block CCB 1, the intra predictor 230 may perform intra prediction on the second chroma coding block CCB 1 after inter prediction is performed on the first chroma coding block CCB 0. The intra predictor 230 may perform intra prediction on the second chroma coding block CCB 1 based on the reconstructed pixel data RPD of the first chroma coding block CCB 0, which is the reference coding unit of the second chroma coding block CCB 1.

Figure 5:
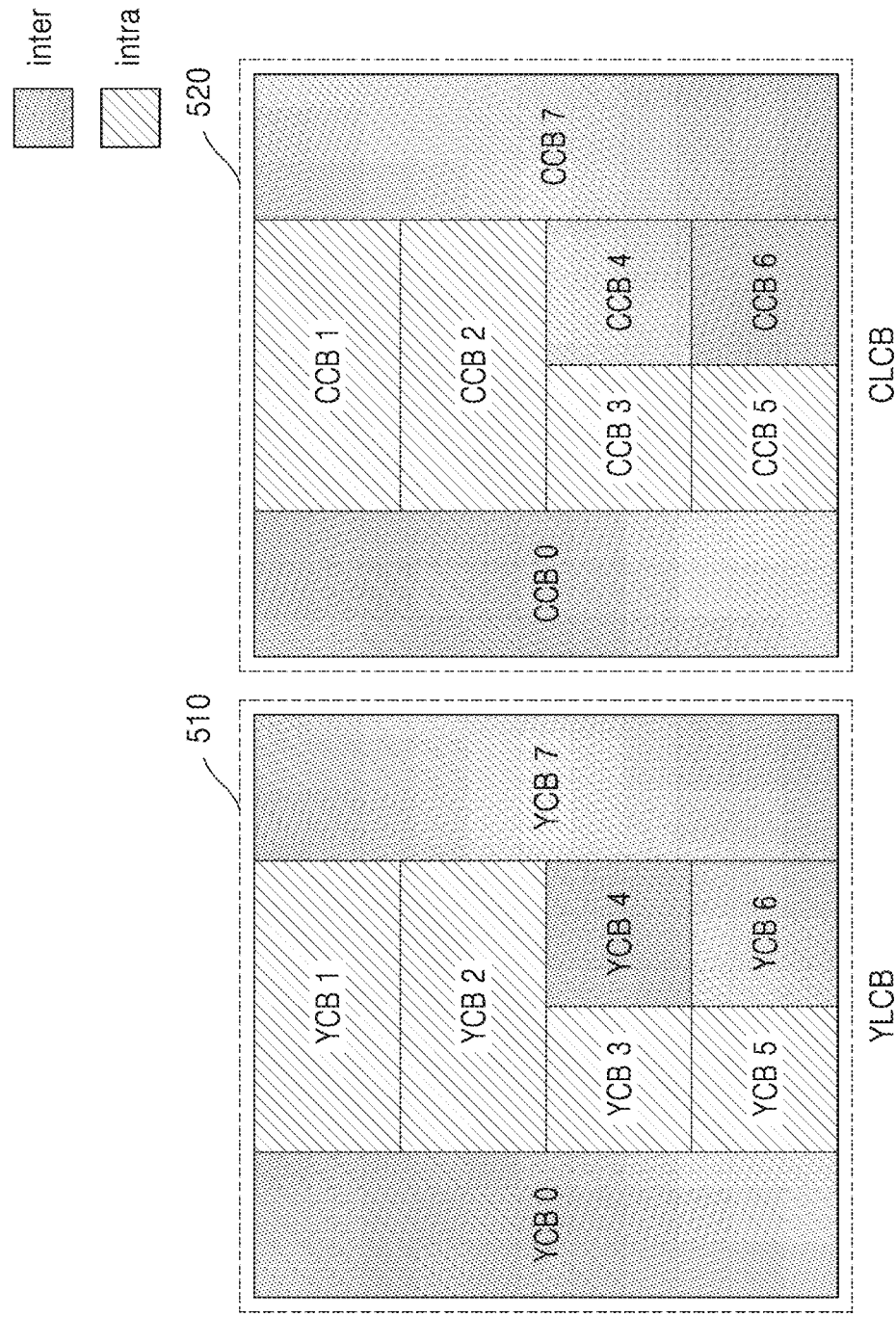
FIG. 5 is a diagram illustrating a large coding unit and coding units, according to an embodiment of the disclosure.

FIG. 5 is a diagram illustrating a large coding unit and coding units, according to an embodiment of the disclosure.

Referring to FIG. 5, the large coding unit may include a luma coding block and a chroma coding block. The shape in which a luma large coding block 510 (hereinafter, also referred to as the YLCB 510) is divided into a plurality of luma coding blocks may be the same as the shape in which a chroma large coding block 520 (hereinafter, also referred to as the CLCB 520) is divided into a plurality of chroma coding blocks. The YLCB 510 and the CLCB 520 of FIG. 5 correspond to the YLCB 310 and the CLCB 320 of FIG. 3, respectively, and thus, descriptions thereof that are already provided above will be omitted.

The YLCB 510 may include a first luma coding block YCB 0, a fifth luma coding block YCB 4, a seventh luma coding block YCB 6, and an eighth luma coding block YCB 7, which are inter coding units. The CLCB 320 may include a second luma coding block YCB 1, a third luma coding block YCB 2, a fourth luma coding block YCB 3, and a sixth luma coding block YCB 5, which are intra coding units. The sizes of the plurality of coding units included in the YLCB 510 may be different from each other.

It is assumed that, for the YLCB 510, decoding is sequentially performed on the first luma coding block YCB 0, the second luma coding block YCB 1, the third luma coding block YCB 2, the fourth luma coding block YCB 3, the fifth luma coding block YCB 4, the sixth luma coding block YCB 5, the seventh luma coding block YCB 6, and the eighth luma coding block YCB 7.

Figure 6:
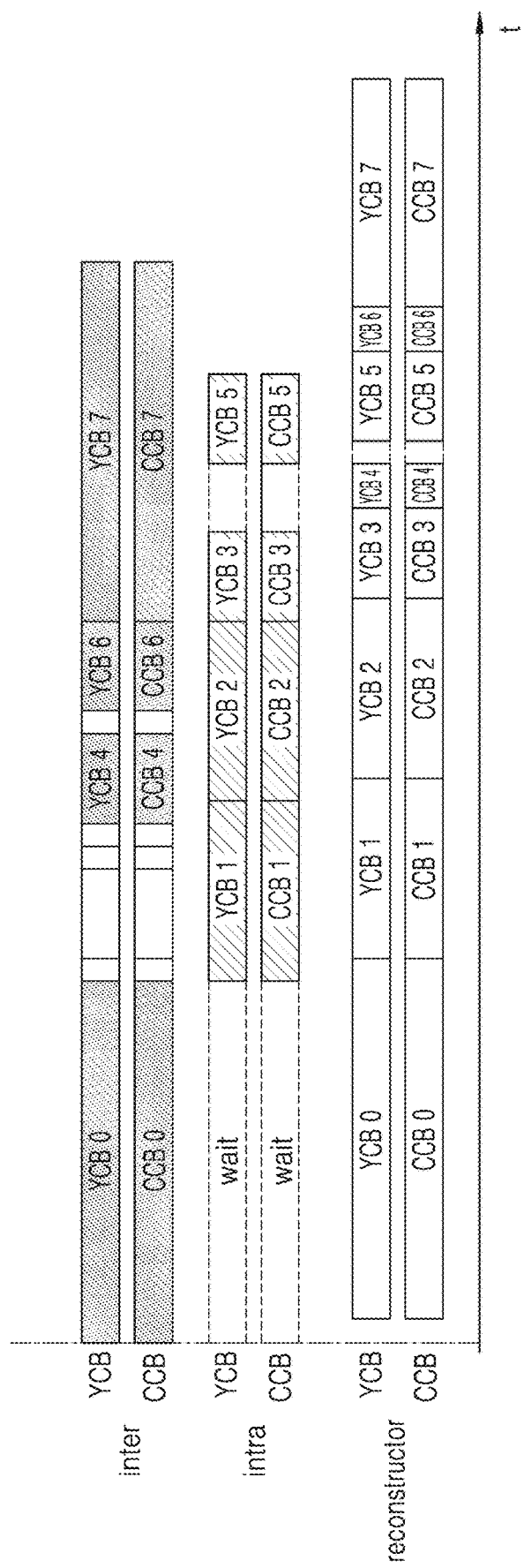
FIG. 6 is a diagram illustrating an operation sequence of the coding units of FIG. 5.

FIG. 6 is a diagram illustrating an operation sequence of the coding units of FIG. 5. Hereinafter, FIGS. 2, 5, and 6 will be referred together.

Because the shapes in which the YLCB 510 is divided into the plurality of luma coding blocks and the shapes in which CLCB 520 divided into the plurality of chroma coding blocks are the same as each other, the periods of time taken for performing inter prediction on the luma coding block and the chroma coding block on the same location, respectively, may be equal to each other. The inter predictor 220 may perform inter prediction on the luma coding block and the chroma coding block at the same point of time. For example, the periods of time taken for performing inter prediction on the first luma coding block YCB 0 and the first chroma coding block CCB 0, respectively, may be equal to each other.

The periods of time taken for performing intra prediction on the luma coding block and the chroma coding block on the same location, respectively, may be equal to each other. The intra predictor 230 may perform intra prediction on the luma coding block and the chroma coding block at the same point of time.

The periods of time taken for reconstructing the luma coding block and the chroma coding block on the same location, respectively, may be equal to each other.

Figure 7:
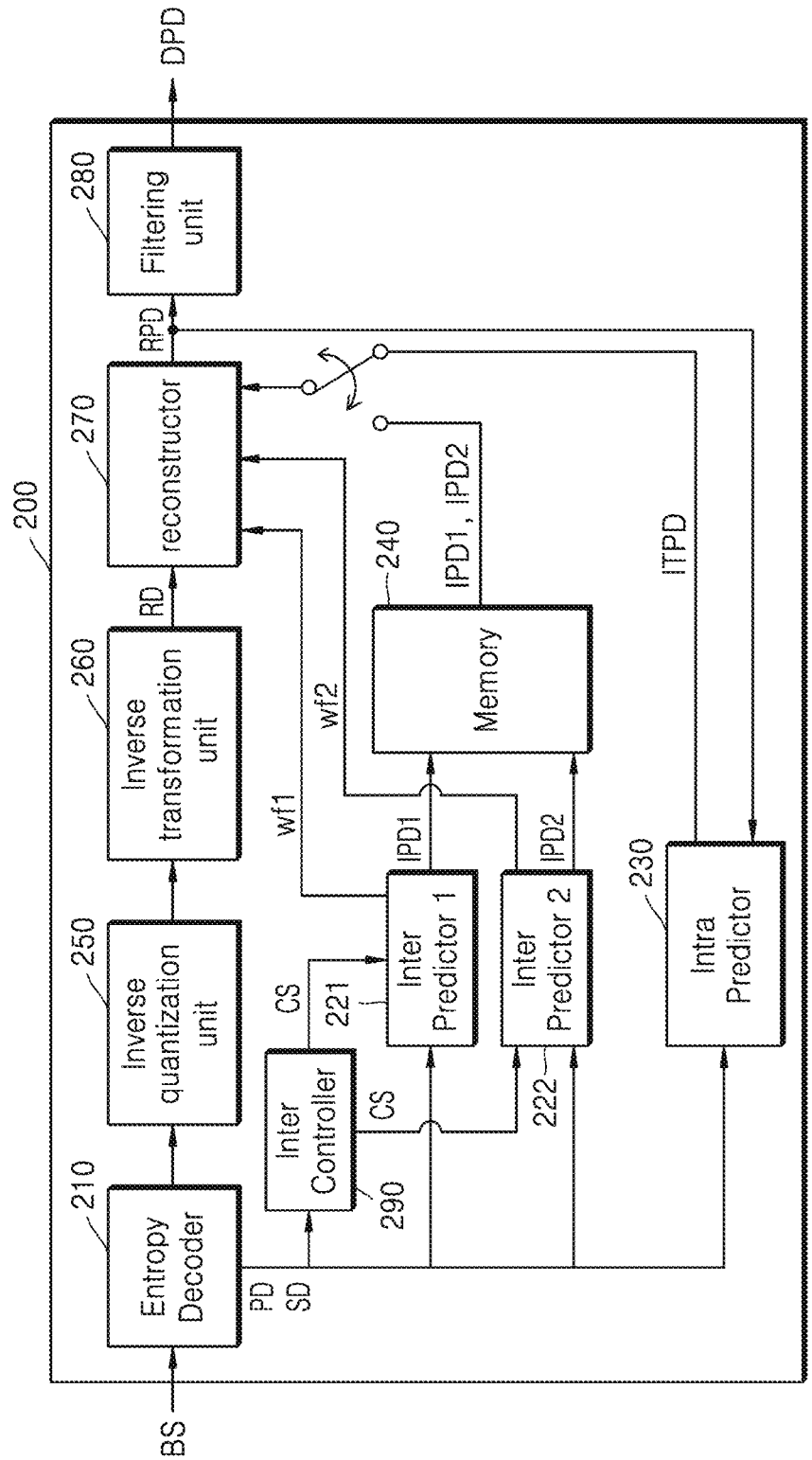
FIG. 7 is a block diagram of the decoding device including a plurality of inter predictors, according to an embodiment of the disclosure.

FIG. 7 is a block diagram of the decoding device 200 including a plurality of inter predictors, according to an embodiment of the disclosure.

Referring to FIG. 7, the decoding device 200 may include the entropy decoder 210, a first inter predictor 221, a second inter predictor 222, the intra predictor 230, the memory 240, the inverse quantization unit 250, the inverse transformation unit 260, the reconstructor 270, the filtering unit 280, and an inter controller 290. The entropy decoder 210, the intra predictor 230, the memory 240, the inverse quantization unit 250, the inverse transformation unit 260, the reconstructor 270, and the filtering unit 280 of FIG. 2 correspond to the entropy decoder 210, the intra predictor 230, the memory 240, the inverse quantization unit 250, the inverse transformation unit 260, the reconstructor 270, and the filtering unit 280 of FIG. 7, respectively, and thus, descriptions thereof that are already provided above will be omitted. The inter predictor 220 of FIG. 2 corresponds to the first inter predictor 221 and the second inter predictor 222 of FIG. 7, and thus, descriptions thereof that are already provided above will be omitted.

The decoding device 200 may include a plurality of inter predictors. Although two inter predictors are illustrated in FIG. 7, the number of inter predictors is not limited thereto. Hereinafter, FIGS. 3 and 7 will be referenced together.

The inter controller 290 may control the plurality of inter predictors to respectively perform inter prediction on different inter coding units. The inter controller 290 may receive the prediction information PD and the sequence information SD from the entropy decoder 210. The inter controller 290 may classify the plurality of coding units based on the prediction information PD and the sequence information SD. The inter controller 290 may generate control signals CS for controlling the plurality of inter predictors to respectively perform inter prediction according to a classification result.

The inter controller 290 may control the first inter predictor 221 and the second inter predictor 222 to perform inter prediction on different inter coding units, respectively. For example, the inter controller 290 may generate the control signals CS for controlling the first inter predictor 221 to perform inter prediction on the first luma coding block YCB 0 and the second inter predictor 222 to perform inter prediction on the third luma coding block YCB 2.

The inter controller 290 may control the first inter predictor 221 to perform inter prediction on inter coding units having odd-numbered decoding sequence indices based on the sequence information SD. In the YLCB 310, the inter coding units having odd-numbered decoding sequence indices may be the first luma coding block YCB 0, the third luma coding block YCB 2, and the eleventh luma coding block YCB 10. The inter controller 290 may control the first inter predictor 221 to perform inter prediction on the luma coding blocks and the chroma coding blocks having odd-numbered decoding sequence indices.

The inter controller 290 may control the second inter predictor 222 to perform inter prediction on inter coding units having even-numbered decoding sequence indices based on the sequence information SD. In the YLCB 310, the inter coding units having even-numbered decoding sequence indices may be the sixth luma coding block YCB 5, the eighth luma coding block YCB 7, the tenth luma coding block YCB 9, and the twelfth luma coding block YCB 11. The inter controller 290 may control the second inter predictor 222 to perform inter prediction on the luma coding blocks and the chroma coding blocks having even-numbered decoding sequence indices.

However, the disclosure is not limited thereto and the inter controller 290 may control the first inter predictor 221 to perform inter prediction on the inter coding units having even-numbered decoding sequence indices and control the second inter predictor 222 to perform inter prediction on the inter coding units having odd-numbered decoding sequence indices.

The first inter predictor 221 may perform inter prediction on the inter coding unit having an odd-numbered decoding sequence index and generate first inter prediction data IPD1, which is a result of performing inter prediction. For example, the first inter predictor 221 may perform inter prediction on the first luma coding block YCB 0 and generate the first inter prediction data IPD1 of the first luma coding block YCB 0.

The first inter predictor 221 may store the first inter prediction data IPD1 in the memory 240. The first inter predictor 221 may transmit, to the reconstructor 270, a first write flag wf1 indicating whether the first inter prediction data IPD1 is stored in the memory 240. The first inter predictor 221 may perform inter prediction on an inter coding unit having an odd-numbered decoding sequence index and transmit the first write flag wf1 to the reconstructor 270 whenever the generated first inter prediction data IPD1 is stored in the memory 240.

Based on the first write flag wf1, the reconstructor 270 may read out the first inter prediction data IPD1 corresponding to the first write flag wf1 from the memory 240. The reconstructor 270 may reconstruct the inter coding unit corresponding to the first write flag wf1 based on the read-out first inter prediction data IPD1. For example, when the first write flag wf1 corresponding to the first luma coding block YCB 0 indicates '1', the reconstructor 270 may read out the first inter prediction data IPD1 of the first luma coding block YCB 0 from the memory 240. The reconstructor 270 may generate the reconstructed pixel data RPD of the first luma coding block YCB 0 by adding the first inter prediction data IPD1 of the first luma coding block YCB 0 to the residual data RD of the first luma coding block YCB 0.

The second inter predictor 222 may perform inter prediction on the inter coding unit having an even-numbered decoding sequence index and generate second inter prediction data IPD2, which is a result of performing inter prediction. For example, the second inter predictor 222 may perform inter prediction on the sixth luma coding block YCB 5 and generate the second inter prediction data IPD2 of the sixth luma coding block YCB 5.

The second inter predictor 222 may store the second inter prediction data IPD2 in the memory 240. The second inter predictor 222 may transmit, to the reconstructor 270, a second write flag wf2 indicating whether the second inter prediction data IPD2 is stored in the memory 240. The second inter predictor 222 may perform inter prediction on an inter coding unit having an even-numbered decoding sequence index and transmit the second write flag wf2 to the reconstructor 270 whenever the generated second inter prediction data IPD2 is stored in the memory 240.

Based on the second write flag wf2, the reconstructor 270 may read out the second inter prediction data IPD2 corresponding to the second write flag wf2 from the memory 240. The reconstructor 270 may reconstruct the inter coding unit corresponding to the second write flag wf2 based on the read-out second inter prediction data IPD2. For example, when the second write flag wf2 corresponding to the sixth luma coding block YCB 5 indicates '1', the reconstructor 270 may read out the second inter prediction data IPD2 of the sixth luma coding block YCB 5 from the memory 240. The reconstructor 270 may generate the reconstructed pixel data RPD of the sixth luma coding block YCB 5 by adding the second inter prediction data IPD2 of the sixth luma coding block YCB 5 to the residual data RD of the sixth luma coding block YCB 5.

Figure 8:
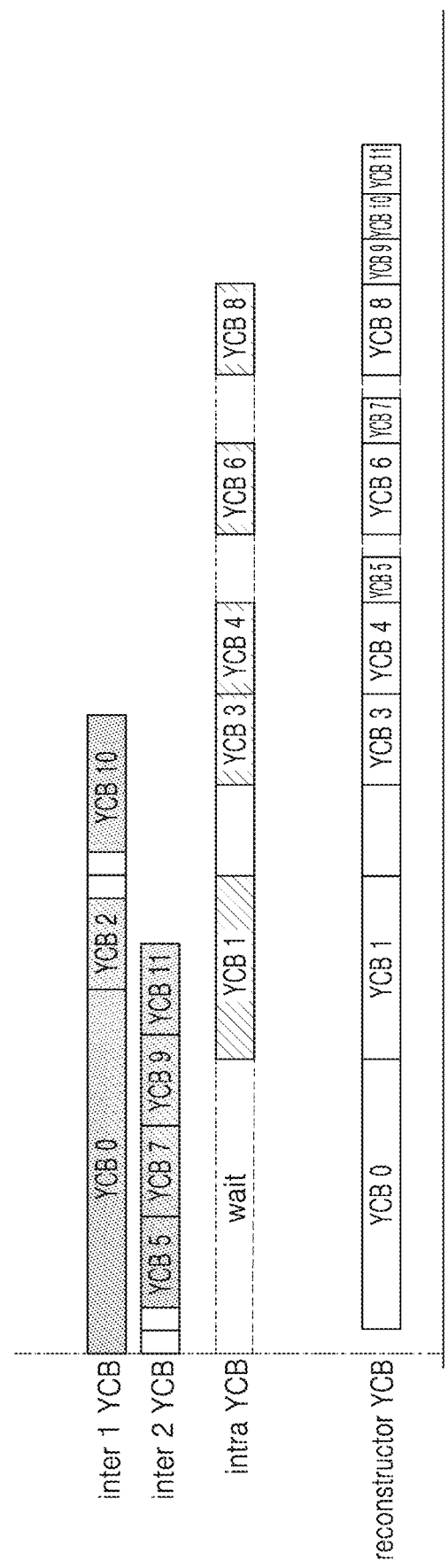
FIG. 8 is a diagram illustrating decoding performed on coding units, according to an embodiment of the disclosure.

FIG. 8 is a diagram illustrating decoding performed on coding units, according to an embodiment of the disclosure. FIG. 8 illustrates decoding performed on the luma coding blocks of the luma large coding block 310 of FIG. 3. Hereinafter, FIGS. 3, 7, and 8 will be referenced together.

The first inter predictor 221 may sequentially perform inter prediction on the first luma coding block YCB 0, the third luma coding block YCB 2, and the eleventh luma coding block YCB 10. The second inter predictor 222 may sequentially perform inter prediction on the sixth luma coding block YCB 5, the eighth luma coding block YCB 7, the tenth luma coding block YCB 9, and the twelfth luma coding block YCB 11.

While the first inter predictor 221 may perform inter prediction on inter coding units having odd-numbered decoding sequence indices, the second inter predictor 222 may perform inter prediction on inter coding units having even-numbered decoding sequence indices. For example, while the first inter predictor 221 may perform inter prediction on the first luma coding block YCB 0, the second inter predictor 222 may perform inter prediction on the sixth luma coding block YCB 5. When the second inter predictor 222 completes inter prediction on the sixth luma coding block YCB 5 before completion of inter prediction by the first inter predictor 221, the second inter predictor 222 may perform inter prediction on the eighth luma coding block YCB 7 while the first inter predictor 221 is still performing inter prediction on the first luma coding block YCB 0.

Because the first luma coding block YCB 0 corresponds to the reference coding unit of the second luma coding block YCB 1, the intra predictor 230 may perform intra prediction on the second luma coding block YCB 1 after inter prediction is performed on the first luma coding block YCB 0. While the intra predictor 230 waits for inter prediction to be completely performed on the first luma coding block YCB 0, the second inter predictor 222 may perform inter prediction on the eighth luma coding block YCB 7. The intra predictor 230 may perform intra prediction on the second luma coding block YCB 1 based on the reconstructed pixel data RPD of the first luma coding block YCB 0, which is the reference coding unit of the second luma coding block YCB 1.

The plurality of inter predictors may perform inter prediction on different inter coding units, and accordingly, the period of time taken for completing inter prediction on all inter coding units may be reduced. Accordingly, the period of time required for the reconstructor 270 to reconstruct the coding units by using the inter prediction data and the period of time required for the intra predictor 230 to perform intra prediction on the intra coding units by using the reconstructed pixel data RPD may be reduced, and the decoding speed of the decoding device 200 may be improved.

Figure 9:
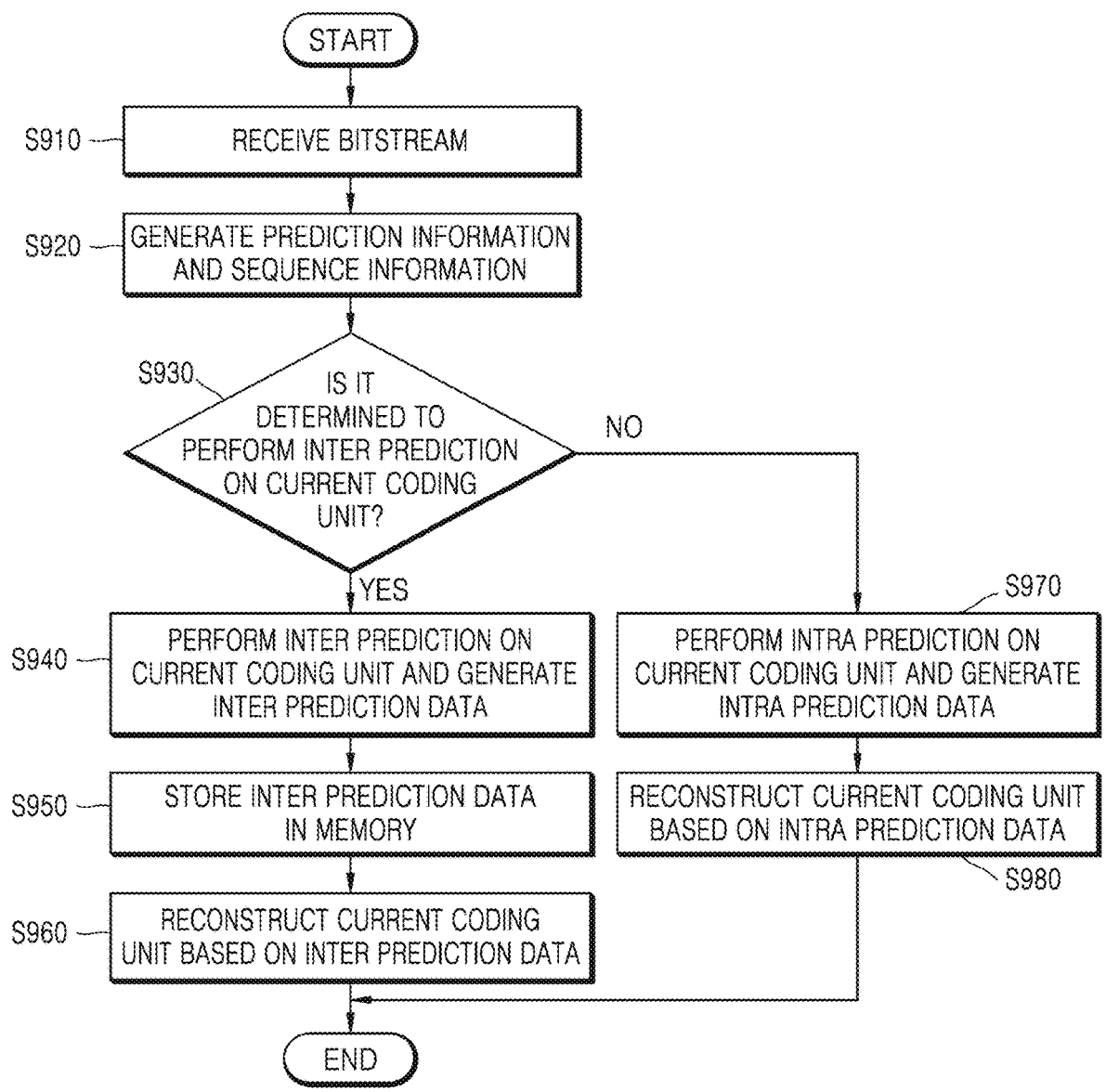
FIG. 9 is a flowchart of an operating method of a decoding device, according to an embodiment of the disclosure.

FIG. 9 is a flowchart of an operating method of a decoding device, according to an embodiment of the disclosure.

In operation S910, the decoding device may receive a bitstream including encoded video data including large coding units each divided into a plurality of coding units.

In operation S920, the decoding device may decode the bitstream and generate prediction information and sequence information. The prediction information indicates a prediction mode of each of the plurality of coding units and may be information indicating whether the prediction mode of each of the plurality of coding units is an inter prediction mode or an intra prediction mode. The sequence information may refer to a sequence in which the plurality of coding units are reconstructed by the decoding device.

In operation S930, the decoding device may determine whether to perform inter prediction on a current coding unit, which is to be currently decoded, based on the prediction information and the sequence information. In detail, the decoding device may determine whether the current coding unit is an inter coding unit based on the prediction information. The decoding device may perform inter prediction according to the decoding sequence index of the current coding unit based on the sequence information.

When the current coding unit is an inter coding unit and it has been determined to perform inter prediction thereon (S940, YES), the decoding device may perform inter prediction on the current coding unit. When the current coding unit is an intra coding unit and it has been determined not to perform inter prediction (S970, NO), the decoding device may perform intra prediction on the current coding unit.

In operation S940, the decoding device may perform inter prediction on the current coding unit and generate inter prediction data. The decoding device may perform inter prediction on each inter coding unit and generate inter prediction data of each of the inter coding unit.

In operation S950, the decoding device may store the generated inter prediction data in a memory. The decoding device may store in the memory the inter prediction data, which is a result of performing inter prediction on each inter coding unit.

The decoding device may generate a write flag indicating whether the inter prediction data is stored in the memory. Based on the write flag, the decoding device may read out the inter prediction data corresponding to the write flag from the memory.

In operation S960, the decoding device may reconstruct the current coding unit based on the inter prediction data. The decoding device may generate reconstructed pixel data of the current coding unit by adding the inter prediction data of the current coding unit read out from the memory to residual data of the current coding unit.

In operation S970, the decoding device may perform intra prediction on the current coding unit and generate intra prediction data. The decoding device may perform intra prediction on each intra coding unit and generate the intra prediction data of each of the inter coding unit.

In operation S980, the decoding device may reconstruct the current coding unit based on the intra prediction data. The decoding device may generate reconstructed pixel data of the current coding unit by adding the intra prediction data of the current coding unit to residual data of the current coding unit.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A decoding method comprising:
receiving a coded bitstream;
decoding the coded bitstream to acquire (1) coding units, (2) prediction information pertaining to the coding units, and (3) sequence information pertaining to the coding units, wherein the coding units comprise intra coding units and inter coding units, and wherein the sequence information indicates a decoding sequence index for each of the coding units;
generating prediction data for each of the coding units based on the prediction information and according to a sequence indicated by the sequence information, wherein the prediction data comprises inter prediction data for the inter coding units and intra prediction data for the intra coding units;
storing the inter prediction data in a memory;
transmitting, to a reconstructor, a write flag indicating that the inter prediction data is stored in the memory; and reconstructing, by the reconstructor, video data for each of the coding units using the corresponding prediction data for the coding unit and according to the sequence indicated by the sequence information.

2. The method of claim 1, further comprising reconstructing the video data for each of the coding units indicated to be an intra coding unit using the intra prediction data corresponding to the coding unit and the inter prediction data corresponding to a coding unit having an earlier index in the sequence.

3. The method of claim 2, further comprising reconstructing the video data for each of the coding units indicated to be an intra coding unit using the intra prediction data corresponding to the coding unit and without using the inter prediction data when no coding unit indicated to be an inter coding unit has an earlier index in the sequence.

4. A decoding device comprising:
an entropy decoder that decodes a coded bitstream to acquire (1) coding units, (2) prediction information pertaining to the coding units, and (3) sequence information pertaining to the coding units, wherein the coding units comprise intra coding units and inter coding units, and wherein the sequence information indicates a decoding sequence index for each of the coding units;
a predictor that generates prediction data for each of the coding units based on the prediction information and according to a sequence indicated by the sequence information, wherein the prediction data comprises inter prediction data for the inter coding units and intra prediction data for the intra coding units;
a memory for storing the inter prediction data; and
a reconstructor that reconstructs video data for each of the coding units using the corresponding prediction data for the coding unit and according to the sequence indicated by the sequence information,
wherein the predictor is further configured to transmit, to the reconstructor, a write flag indicating that the inter prediction data is stored in the memory.

5. The decoding device of claim 4, wherein the reconstructor reconstructs the video data for each of the coding units indicated to be an intra coding unit using the intra prediction data corresponding to the coding unit and the inter prediction data corresponding to a coding unit having an earlier index in the sequence.

6. The decoding device of claim 5, wherein the reconstructor reconstructs the video data for each of the coding units indicated to be an intra coding unit using the intra prediction data corresponding to the coding unit and without using the inter prediction data when no coding unit indicated to be an inter coding unit has an earlier index in the sequence.

7. A decoding device comprising:
an entropy decoder configured to decode a coded bitstream to obtain prediction information indicating a prediction mode of each of a plurality of coding units and sequence information indication a decoding sequence index of the plurality of the coding units, wherein the plurality of coding units comprises intra coding units and inter coding units;
a first inter predictor and a second inter predictor configured to perform inter prediction on each of the inter coding units, which are coding units to perform inter prediction among the plurality of coding units, based on the prediction information;
an inter controller configured to receive the sequence information and the prediction information, and to control the first inter predictor and the second inter predictor to perform inter prediction on different inter coding units among the plurality of coding units;
a memory for storing inter prediction data, which is a result of performing inter prediction on each of the inter coding units; and
a reconstructor configured to reconstruct each of the inter coding units, based on the inter prediction data stored in the memory,
wherein each of the first inter predictor and the second inter predictor is further configured to transmit to the reconstructor a write flag indicating that the inter prediction data is stored in the memory.

8. The decoding device of claim 7, wherein the inter controller configured to classify the plurality of coding units based on the sequence information and the prediction information.

9. The decoding device of claim 8, wherein the inter controller configured to generate a control signal that controls the first inter predictor and the second inter predictor to perform inter prediction according to the classification result.

10. The decoding device of claim 7, wherein the inter controller configured to control the first inter predictor and the second inter predictor based on the sequence information, that the first inter predictor to sequentially perform inter prediction on first inter coding units in which the decoding sequence index has a first condition, and the second inter predictor to sequentially perform inter prediction on second inter coding units in which the decoding sequence index has a second condition.

11. The decoding device of claim 10, wherein the first condition is that the decoding sequence index is odd number, the second condition is that the decoding sequence index is an even number.

12. The decoding device of claim 11, while the first inter predictor performs inter prediction on a first plurality of inter coding units of a first order among the first inter coding units,
the second inter predictor is configured to perform inter prediction on a second plurality of inter coding units of the first order among the second inter coding units.

13. The decoding device of claim 12, if the inter prediction of the second inter coding unit of the first order is completed while the first inter predictor performs inter prediction on the first inter coding unit of the first order among the first inter coding units,
the second inter predictor is configured to perform inter prediction on a second inter coding unit in a second order among the second inter coding units.

14. The decoding device of claim 7, wherein:
an intra predictor configured to perform, based on the prediction information, intra prediction on each of the intra coding units, which are coding units to undergo intra prediction among the plurality of coding units, and generate intra prediction data, which is a result of performing intra prediction on each of the intra coding units; and
the reconstructor further configured to reconstruct each of the intra coding units based on the intra prediction data.

15. The decoding device of claim 14, wherein each of the first inter predictor and the second inter predictor is further configured to transmit the write flag to the reconstructor whenever the inter prediction data of each of the inter coding units is generated.

16. The decoding device of claim 15, wherein the reconstructor is further configured to read out, based on the write flag, the inter prediction data corresponding to the write flag from the memory and reconstruct the inter coding unit corresponding to the write flag based on the inter prediction data.

17. The decoding device of claim 14, wherein the reconstructor is further configured to reconstruct each of the inter coding units and each of the intra coding units, based on the sequence information, and generate reconstructed pixel data of each of the inter coding units and each of the intra coding units.

* * * * *